US011715230B2

(12) United States Patent
Foutzitzis et al.

(10) Patent No.: US 11,715,230 B2
(45) Date of Patent: Aug. 1, 2023

(54) SYSTEM AND METHOD FOR DETECTING OBJECTS IN VIDEO IMAGES

(71) Applicant: Defender LLC, Nottingham, MD (US)

(72) Inventors: Evangelos Foutzitzis, Nottingham, MD (US); Derry Goberdhansingh, Silver Spring, MD (US)

(73) Assignee: DEFENDER LLC, Nottingham, MD (US)

( * ) Notice: Subject to any disclaimer, the term of this patent is extended or adjusted under 35 U.S.C. 154(b) by 0 days.

(21) Appl. No.: 17/494,705

(22) Filed: Oct. 5, 2021

(65) Prior Publication Data

US 2022/0108467 A1     Apr. 7, 2022

Related U.S. Application Data

(60) Provisional application No. 63/088,231, filed on Oct. 6, 2020.

(51) Int. Cl.
*G06T 7/70* (2017.01)
*G01S 19/48* (2010.01)
*G06T 7/50* (2017.01)
*G06V 20/40* (2022.01)
(Continued)

(52) U.S. Cl.
CPC ............ *G06T 7/70* (2017.01); *G01S 19/485* (2020.05); *G06F 18/214* (2023.01); *G06T 7/50* (2017.01); *G06V 20/40* (2022.01); *H04N 23/698* (2023.01); *G06T 2207/10016* (2013.01); *G06T 2207/20081* (2013.01)

(58) Field of Classification Search
None
See application file for complete search history.

(56) References Cited

U.S. PATENT DOCUMENTS

| 7,221,866 | B2 | 5/2007 | Clemens |
| 9,743,060 | B1 | 8/2017 | Matias et al. |
| 10,186,075 | B2 | 1/2019 | Foutzitzis et al. |

(Continued)

OTHER PUBLICATIONS

International Search Report for Application No. PCT/US2017/063943 dated Mar. 1, 2018, 1 page.

*Primary Examiner* — Eileen M Adams
(74) *Attorney, Agent, or Firm* — Howard & Howard Attorneys PLLC

(57) ABSTRACT

A networked computer system for recognizing objects in video images is described herein. The networked computer system includes a user display device, a camera, and an object recognition system. The camera includes an imaging device having a 360° field-of-view and a global positioning system (GPS) device. The object recognition system includes a processor programmed to execute an algorithm including receiving live-stream video images from the camera, detecting an object of interest within the live-stream video images, determining pixel coordinates associated with a center of the detected object of interest, receiving the geographic location data from the camera, determining a geographic location of the object of interest based on the determined pixel coordinates and the geographic location of the camera, and displaying the live-stream video images on the user display device including a visual indicator of the object of interest and the determined geographic location of the object of interest.

12 Claims, 13 Drawing Sheets

(51) Int. Cl.
  *G06F 18/214*    (2023.01)
  *H04N 23/698*    (2023.01)

(56) References Cited

U.S. PATENT DOCUMENTS

| | | |
|---|---|---|
| 2008/0076556 A1 | 3/2008 | Icart |
| 2014/0152655 A1 | 6/2014 | Johnston et al. |
| 2015/0264340 A1 | 9/2015 | Seidl et al. |
| 2017/0323422 A1 | 11/2017 | Kim et al. |
| 2017/0339392 A1 | 11/2017 | Forutanpour et al. |
| 2018/0150994 A1* | 5/2018 | Foutzitzis .......... H04N 5/23238 |
| 2019/0325227 A1* | 10/2019 | Smith .................. H04N 21/631 |
| 2021/0279475 A1* | 9/2021 | Tusch ................ H04L 63/0861 |

* cited by examiner

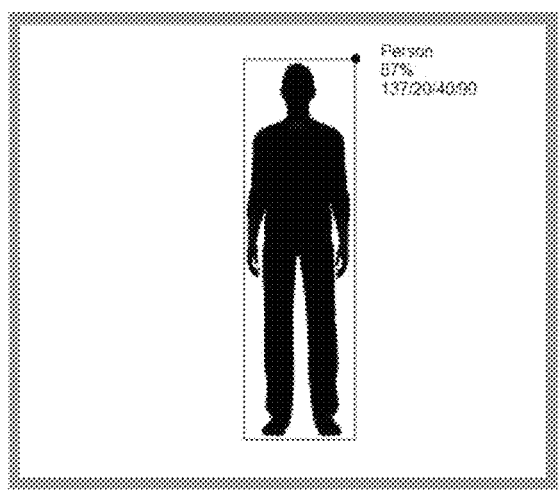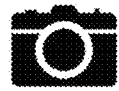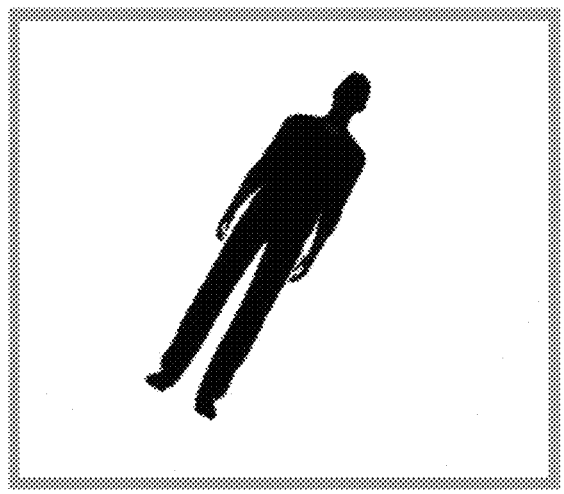
FIG. 5              FIG. 6

```
/* function to compute camera pan and tilt angles corresponding to a fisheye image location */
struct position2d compute_fisheye_camera_position(
        float x,
        float y,
        float fov,
        int imageWidth,
        int imageHeight,
        int cameraDirection /*0: camera looking down, 1: camera looking down */
        )
{
    struct position2d p = {-1, -1};
    int max_radial_distance;
    float xc, yc, xd, yd, radial_distance, tilt, theta;

if( x >= imageWidth || x < 0 || y >= imageHeight || y < 0)
    {
        printf("Error: point outside fisheye camera image ...\n");
        return p;
    }
    fov = fov/2;
    max_radial_distance = min(imageWidth/2, imageHeight/2);
    xc = imageWidth/2.0f;
    yc = imageHeight/2.0f;
    xd = xc - x;
    yd = y - yc;
    radial_distance = sqrt(xd*xd + yd*yd);
    if(radial_distance>max_radial_distance)
    {
        printf("Error: point outside fisheye camera image disc\n");
        return p;
```

```
} tilt = (fov/max_radial_distance)*radial_distance;

if (cameraDirection>0)
{
    tilt = 90 - tilt;
}
else
{
    tilt = -90 + tilt;
} theta = atan2(yd, xd);
theta = 360*theta/(2*M_PI);
if(theta < 0)
{
    theta = 360 + theta;
}
theta = 270 - theta;

p.x = theta;
p.y = tilt;

return p;
}
```

FIG. 21 Cont.

SYSTEM AND METHOD FOR DETECTING OBJECTS IN VIDEO IMAGES

CROSS-REFERENCE TO RELATED APPLICATION

This application claims the benefit of U.S. Provisional Patent Application Ser. No. 63/088,231, filed Oct. 6, 2020, the disclosure of which is hereby incorporated by reference in its entirety.

FIELD OF THE DISCLOSURE

The present invention relates to recognizing objects in video images, and more particularly, to systems and methods for recognizing objects in video images captured by 360° field-of-view fisheye cameras.

BACKGROUND

While image processing Artificial Intelligence algorithms are quite popular on identifying objects of interest (object detection) within a given image frame or series of frames (video), they are based on the principle that an image frame is rectangular and the objects will always appear with their default orientation. More specifically a deep learning framework is trained to identify the objects of interest by supplying to it a big number of frames encapsulating and designating these objects. Since the cameras used to capture the objects of interests are 2-Dimensional, the objects will always appear with their "natural" orientation. At least some known deep learning framework algorithms are trained to recognize, classify and track objects of interest when these objects appear with their natural orientation. These algorithms fail to recognize the object of interest when the object appears rotated at an angle different than its nominal one.

The present invention is aimed at one or more of the problems identified above.

SUMMARY OF THE INVENTION

In one aspect of the present invention, a networked computer system for recognizing objects in video images is provided. The networked computer system includes a user display device, a camera, and an object recognition system. The camera includes an imaging device having a 360° field-of-view and a global positioning system (GPS) device configured to transmit geographic location data including information indicating the geographic location of the camera. The object recognition system includes a processor programmed to execute an algorithm including the steps of receiving live-stream video images from the camera, detecting an object of interest within the live-stream video images, determining pixel coordinates associated with a center of the detected object of interest, receiving the geographic location data from the camera, determining a geographic location of the object of interest based on the determined pixel coordinates and the geographic location of the camera, and displaying the live-stream video images on the user display device including a visual indicator of the object of interest and the determined geographic location of the object of interest.

In another aspect of the present invention, a method of operating a networked computer system for recognizing objects in video images is provided. The networked computer system including a user display device, a camera including an imaging device having a 360° field-of-view and a GPS device configured to transmit geographic location data including information indicating the geographic location of the camera, and an object recognition system including a processor. The method includes the processor performing an algorithm including the steps of receiving live-stream video images from the camera, detecting an object of interest within the live-stream video images, determining pixel coordinates associated with a center of the detected object of interest, receiving the geographic location data from the camera, determining a geographic location of the object of interest based on the determined pixel coordinates and the geographic location of the camera, and displaying the live-stream video images on the user display device including a visual indicator of the object of interest and the determined geographic location of the object of interest.

In yet another aspect of the present invention, a non-transitory computer-readable storage media having computer-executable instructions embodied thereon to operate a networked computer system for recognizing objects in video images is provided. The networked computer system including a user display device, a camera including an imaging device having a 360° field-of-view and a GPS device configured to transmit geographic location data including information indicating the geographic location of the camera, and an object recognition system including a processor. When executed by the processor, the computer-executable instructions cause the processor to perform an algorithm including the steps of receiving live-stream video images from the camera, detecting an object of interest within the live-stream video images, determining pixel coordinates associated with a center of the detected object of interest, receiving the geographic location data from the camera, determining a geographic location of the object of interest based on the determined pixel coordinates and the geographic location of the camera, and displaying the live-stream video images on the user display device including a visual indicator of the object of interest and the determined geographic location of the object of interest.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 5-21 are illustrations of the algorithms that may be implemented by the system shown in FIG. 1 for recognizing objects in video images and presenting content on the device display.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

Figure 1:
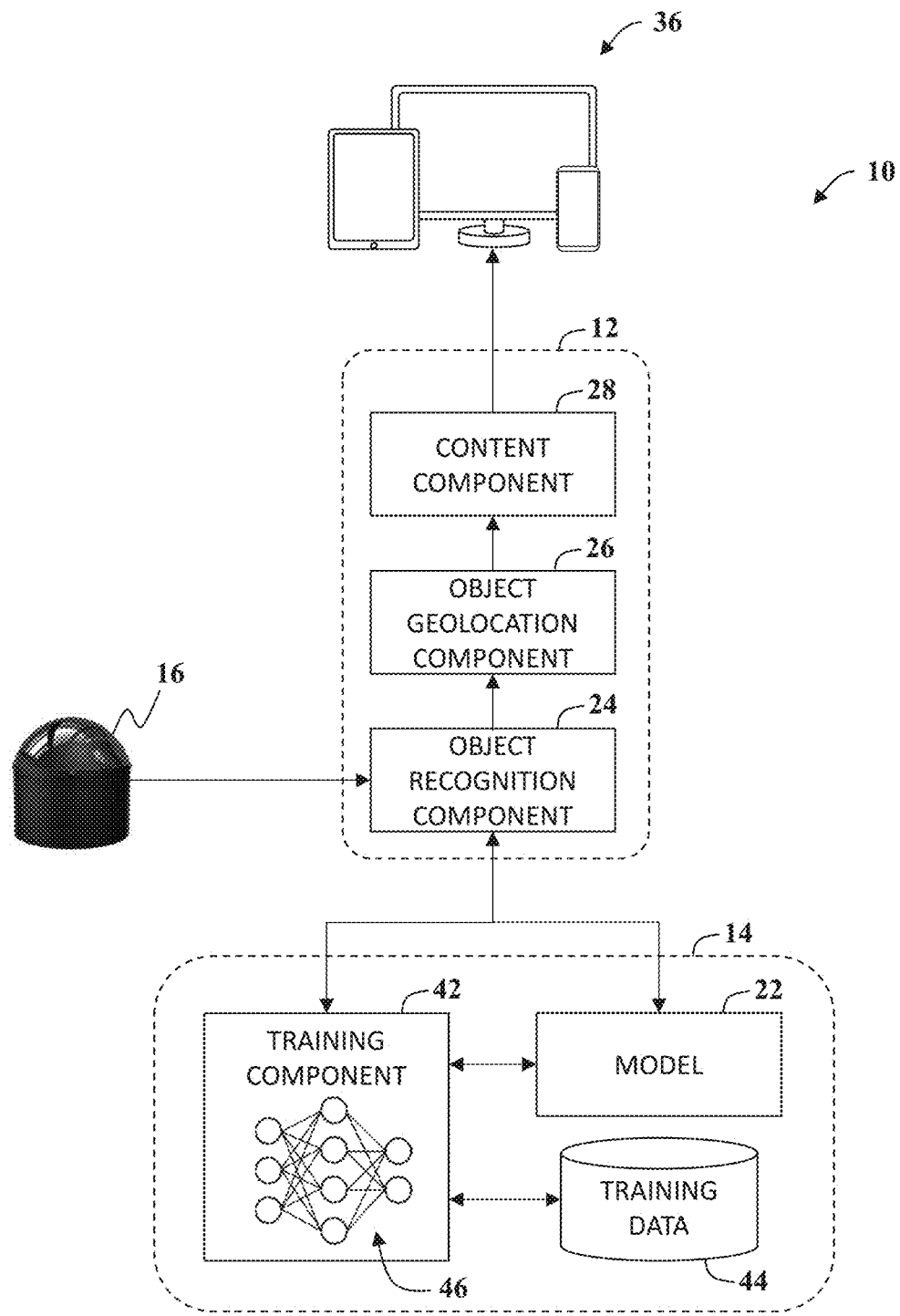
FIG. 1 is a schematic illustrating various aspects of a system, according to the present invention.
Figure 2:
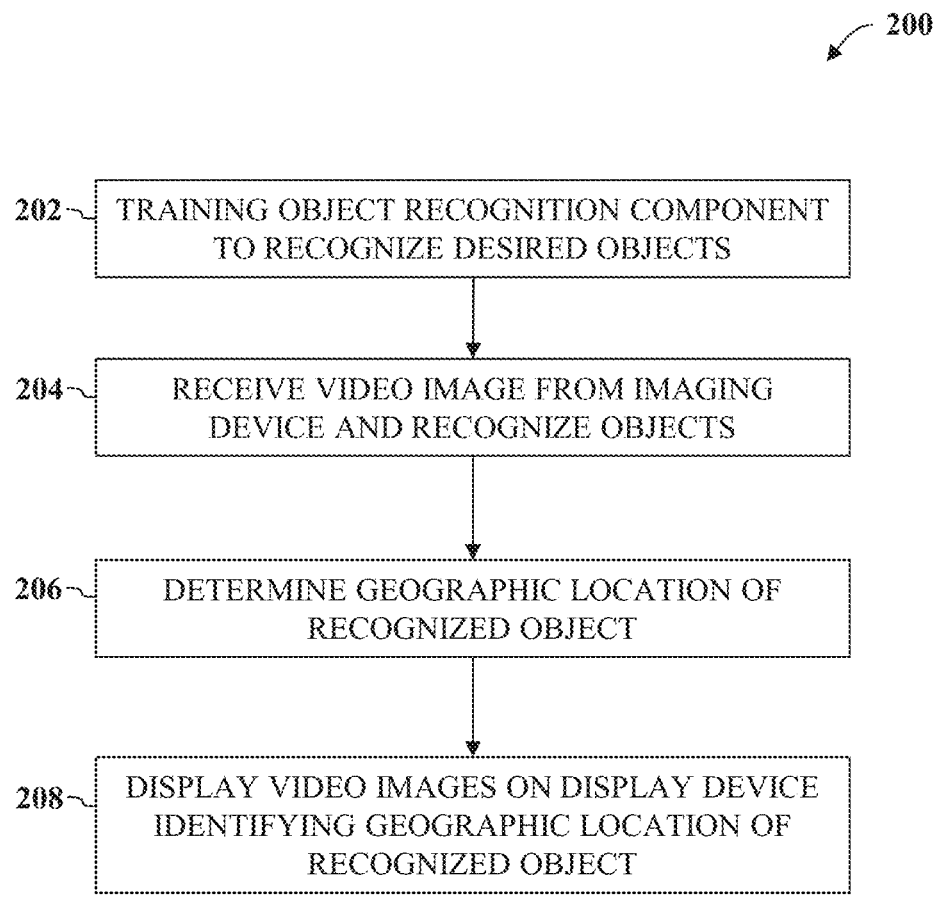
FIG. 2 is flowchart of an algorithm that may be implemented by the system shown in FIG. 1 for recognizing objects in video images and presenting content on a device display.
Figure 3:
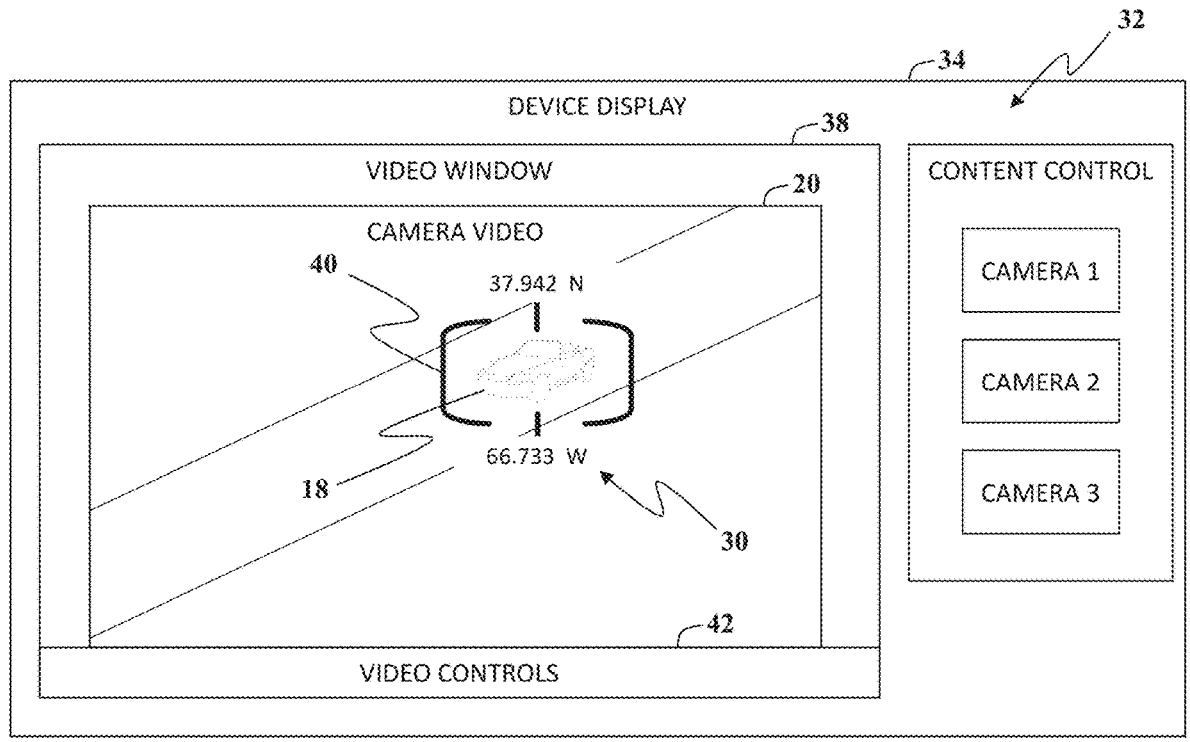
FIGS. 3 and 4 are schematic illustrations of graphical user interfaces displayed on the device display including video showing objects recognized by the system.
Figure 4:
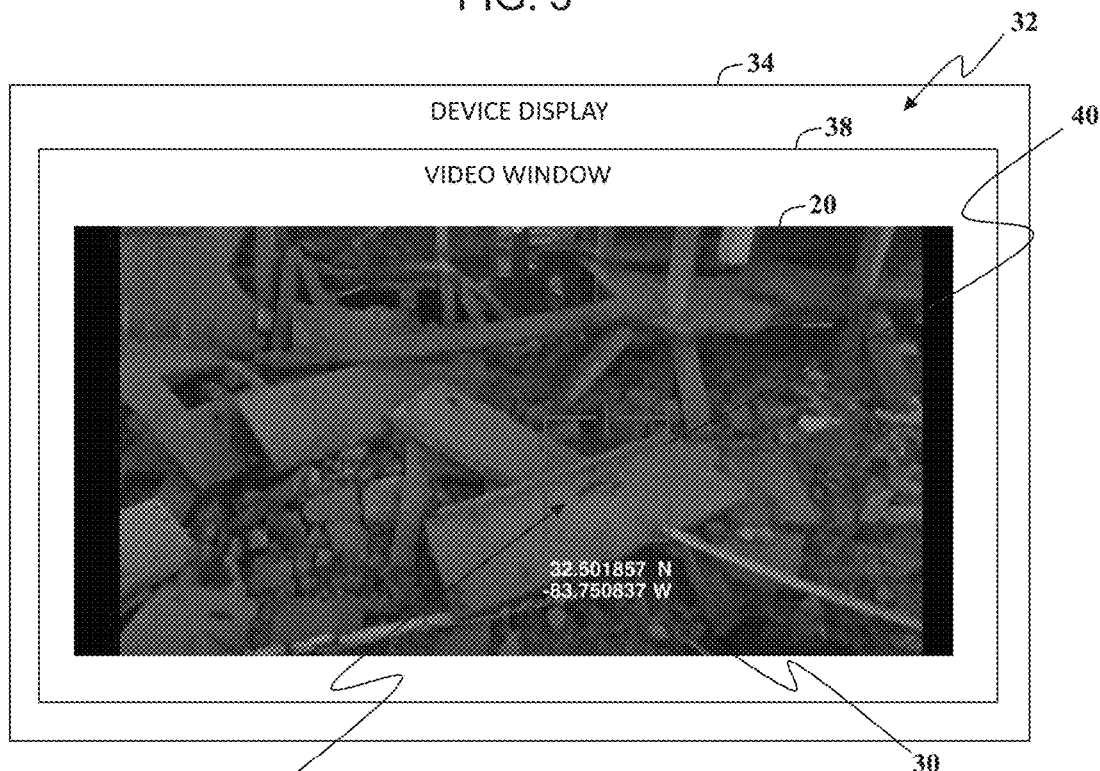

With reference to the drawings and in operation, the embodiments of the present invention provide a system for recognizing objects appearing in video images captured with 360° field-of-view (FOV) camera and determining the geographic coordinates of recognized objects.

Referring to FIGS. 1-4, in the illustrated embodiment, the present invention includes a system 10 that is programmed to detect and recognize objects in live-stream video images, determine the geographic locations of the recognized objects in near real-time, and generate a graphic user interface on a device display that includes a presentation of the video images including visual indicators of the recognized objects and corresponding geographical coordinates. The system 10 includes an object recognition system 12 and a training system 14. The object recognition system 12 is coupled to one or more imaging devices 16 for receiving live-stream video images from the imaging devices 16 and detecting and recognizing objects 18 appearing in the live-stream video images 20. The imaging devices 16 may include, for example, a Quantum 360™ Rover Camera™ sold by Defender™ LLC. The training system 14 is programmed to generate an image recognition training model 22 that is used by the object recognition system 12 to detect and recognize the objects 18 appearing in the live-stream video images.

The object recognition system 12 includes an object recognition component 24, an object geolocation component 26, and a content component 28. The object recognition component 24 is programmed to receive live-stream video images from the imaging devices and identify recognized objects appearing in the live-stream video images. For example, the object recognition component 24 may configured to perform recognition processing of the objects 18 in the video 20 to, for example, identify a specific object (e.g., person) or multiple objects (e.g., people, vehicles, drones, items, etc.) where the recognition processing is performed using the training model 22.

The object geolocation component 26 is programmed to determine a geographic location of the objects 18 recognized by the object recognition component 24 including the object's geographic coordinates 30. The content component 28 is programmed to generate and display a graphic user interface 32 including a presentation of the video 20, one or more recognized objects 18, and corresponding geographic coordinates 30 in a device display 34. For example, the content component 28 may be programmed to distribute the presentation to one or more client personal devices 36. The client personal devices 36 may include, for example, tablet computers, laptop computers, desktop computers, smart phones, and the like, that may be used by users watching the video images 20. The presentation may include a video window 38 in which the live-stream video image 20 is presented. The presentation may also include a visual indicator 40 of the recognized object 18 and display the corresponding geographic coordinates 30 adjacent to the visual indicator 40. The video window 38 can include various controls and indicators 42 such as forward, pause, fast forward, reverse, fast reverse, speaker volume control, and so on, commonly associated with user controls in viewing a video.

The training system 14 includes a training component 42 that is programmed to train the training model 22 using training data 44. The training component 42 can be configured to derive and output training data 44 from video images, and use the training data 44 ultimately for identification of objects 18 in the video 20 via the training model 22. The training component 42 may also be configured to train the model 22 using a set of tagged (labeled) images of the objects 18 to learn features of the objects 18. For example, images of objects that are desired to be recognized can be obtained and tagged for training the model 22. The training component 42 may include an artificial intelligence (AI) system 46 that processes full-frame 360-degree video and still images.

The AI system 46 may include an artificial neural network (ANN) including a machine learning network comprising a number of highly interconnected processing elements (artificial neurons) that process information by their dynamic state response to inputs including inputs dependent upon the dynamic state response of interconnected artificial neurons. It can be, for example, a shallow neural network, deep neural network (DNN), a recurrent neural network (RNN), Convolutional neural network (CNN), a Generative adversarial network (GAN), a Capsule Neural Network (CapsNet), etc. The ANN may include a number of highly interconnected processing elements (artificial neurons) that process information by their dynamic state response to external inputs. The ANN may be arranged as a directed graph whose nodes are artificial neurons and whose vertices are connections between artificial neurons. Each neuron can be configured to determine whether or not a weighted sum of its inputs causes an activation function to produce an output. In a layered ANN, an input layer is the first layer and receives at least some of its inputs from outside the ANN and an output layer is the final layer and provides at least some of its outputs outside the ANN. The layers between the first and final layer are hidden layers. For artificial neurons in the hidden layer(s) and the final layer, the inputs are outputs from the artificial neurons in the preceding layer.

An artificial neural network can be defined in hardware using a hardware component for each neuron and physically interconnected the hardware components to form the artificial neural network. For example, each artificial neuron may be simulated using programmed instructions that are executed by a controller. Each artificial neuron may also be a different controller or other circuitry configured to perform the neuron's function. An artificial neural network can be defined in software for example using Python, Matlab or Octave.

Each component may include one or more server computers that each include a processing device that includes a processor that is coupled to a memory device. The processing device executes various programs, and thereby controls components of the server according to user instructions received from the other servers. The processing device may include memory, e.g., read only memory (ROM) and random-access memory (RAM), storing processor-executable instructions and one or more processors that execute the processor-executable instructions. The components of the system 10 may be communicate via a communications network such, as, for example, the Internet, a cellular telecommunications network, a wireless network and/or any suitable telecommunication network.

Figure 22:
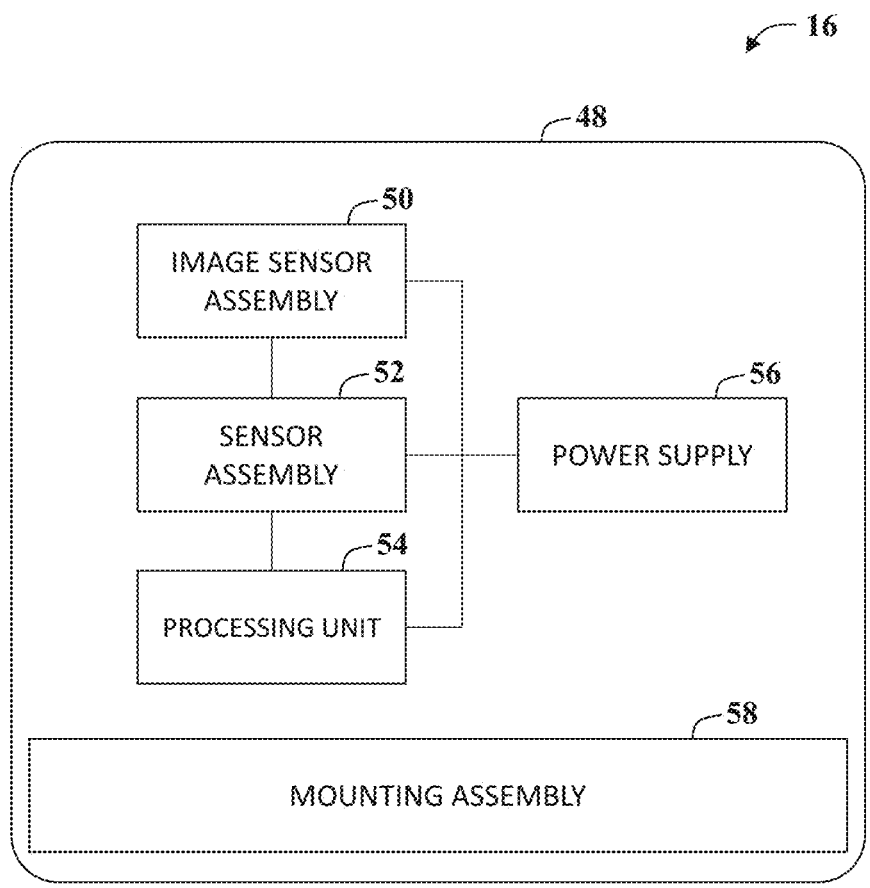
FIG. 22 is a schematic diagram of a camera that may be used with the system shown in FIG. 1.

Referring to FIG. 22, in some embodiments the camera 16 includes a housing 48 containing a plurality of camera components including an image sensor assembly 50, a positioning sensor assembly 52, a processing unit 54, and a power supply 56. The camera 16 may also include a mounting assembly 58 coupled to the housing 48 to enable the camera to be removable mounted to a vehicle.

In some embodiments, the image sensor assembly 50 may include: Lens/Field of View (FOV): F/2.88, 11 element glass, Titanium frame, Continuous 360 degrees (H)×250 degrees (V), Dewarped region (100)H×(60) V, Dewarped region Full zoom (67)H×(40) V; Orientation: Camera pointing Up or Down; Zoom: Digital zoom×6; and Resolution/FPS: 2880×2880, 2048×2048, 1920×1920, 1728×1728, 1440×1440, 1200×1200, 720×720, 640×640, 480×480 selectable, FPS: up to 30 fps. The positioning sensor assembly 52 may include: Sensors: GPS, IMU with Dual GPS for accurate compassing option, NVIDIA GPU for deep learning object detection and tracking option. The processing unit 54 may include: Connectivity: High Power WiFi (up to 1 W), 802.11b/g/n WiFi, up to 150 Mbps, Adjustable WiFi Transmit Power, 150 Mbps (DL) 4G/LTE, Global LTE Band Support, Full Scale Access Point, AP Station, Repeater, 10/100 Ethernet Port for direct Network connection, 5G Support over WiFi/Ethernet; Compression: H264Base, main, High, MJPEG and zipstream adaptive compression; Event triggers: Analytics, edge storage events; Event actions: Record video: SD card and network share Upload of images or video clips: FTP, SFTP, HTTP, HTTPS, network share and email; Audio: Supported through Network enabled microphone, Weight: 550 gr (1.2 lbs) (with magnet mount); Network Security: Password protection, IP address filtering, HTTPS encryption, IEEE 802.1X network access control, digest authentication, user access log, centralized certificate management; Recordings: Up to 90 days onboard, Recordings extraction and save to hard drive/cloud. The power supply 56 may include 12-48V DC (jumper selectable), Passive POE. The mounting assembly 58 may include Mounts: Magnetic mount option, M3 pass through holes, M3 threads (×4), ¼-20" threads, Custom mounts availability, Spirit drone mount. The housing 48 may also be waterproof, dustproof, and include a replaceable Lexan™ dome.

In the illustrated embodiment, the system 10 includes a networked computer system for recognizing objects in video images. The networked computer system includes a user display device 34, the camera 16, and the object recognition system 12. The camera 16 includes an imaging device having a 360° field-of-view and a global positioning system (GPS) device configured to transmit geographic location data including information indicating the geographic location of the camera 16. The object recognition system 12 includes a processor programmed to execute an algorithm including the steps of receiving live-stream video images from the camera, detecting an object of interest within the live-stream video images, determining pixel coordinates associated with a center of the detected object of interest, receiving the geographic location data from the camera, determining a geographic location of the object of interest based on the determined pixel coordinates and the geographic location of the camera, and displaying the live-stream video images on the user display device including a visual indicator of the object of interest and the determined geographic location of the object of interest. In some embodiments, the system 10 also includes a training system 14 programmed to generate an image recognition training model 22 for use by the object recognition system 12. The training system includes an artificial intelligence (AI) system programmed to processes full-frame 360-degree video images to train the image recognition training model. The processor of the object recognition system 12 is programmed to execute the algorithm including the steps of accessing the image recognition training model for use in detecting the object of interest within the live-stream video images.

With reference to FIGS. 2-21, in the illustrated embodiment, the system 10 may be programmed to execute the algorithms 200 and 300 for detecting objects in video images received from an imaging device having a 360-degree FOV. The methods include a plurality of steps that may be performed independently of, or in combination with, other method steps. Portions of the methods may be performed by any one of, or any combination of, the components of the system 10.

In method step 202, the training system 14 is programmed to generate the training model 22 and train the object recognition component 24 to recognize desired objects appearing in video images received from the imaging device 16 including a 360-degree FOV fisheye camera.

Deep learning frameworks are trained to identify a person (e.g., object of interest) by a conventional 2-Dimensional camera (for example a smartphone camera) and classify the object as a "person". The classification includes a "certainty index" signifying the amount of confidence that the detected object is a "person". Readily available databases have been created that can be used to train the deep learning frameworks by supplying them with a big number of "object of interest" images. Different libraries exist for training these networks to identify, classify and track various types of objects. Problems arise when the cameras used to identify the objects are rotated in any axis, so the object of interest does not appear with its natural orientation. For example, a deep learning framework that was trained to identify a person in a natural orientation, does not recognize it when the camera is rotated because the object appears tilted inside the camera frame. Deep learning framework algorithms are trained to recognize, classify and track objects of interest when these objects appear with their natural orientation (shown in FIG. 5). These algorithms fail to recognize the object of interest when the object appears rotated at an angle different than its nominal one (shown in FIG. 6).

Figure 7:
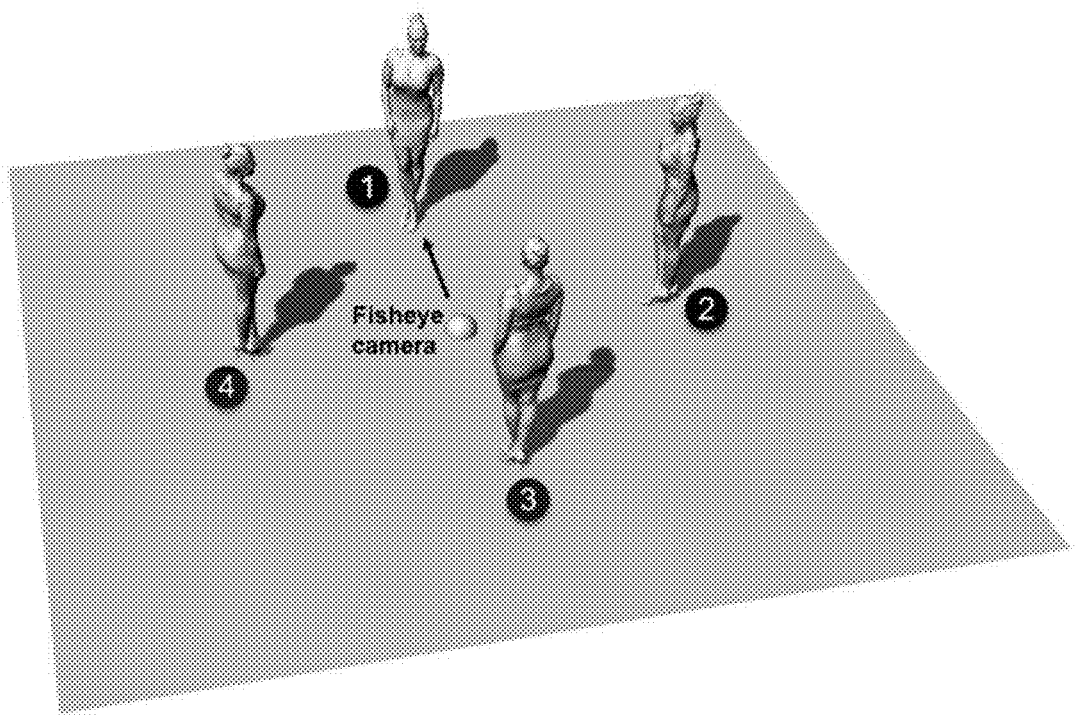
Figure 8:
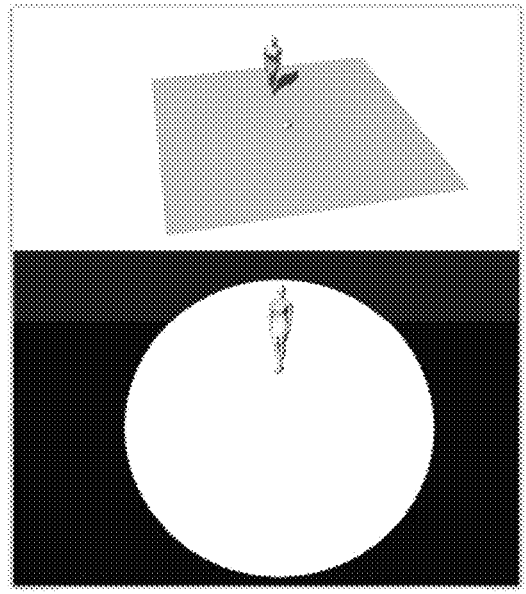
Figure 9:
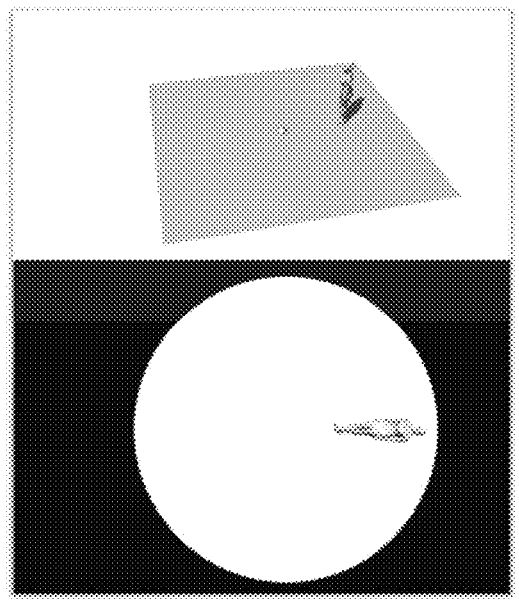
Figure 10:
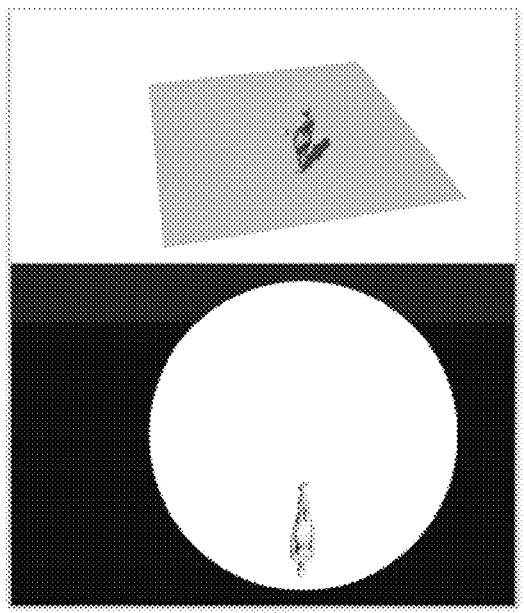
Figure 11:
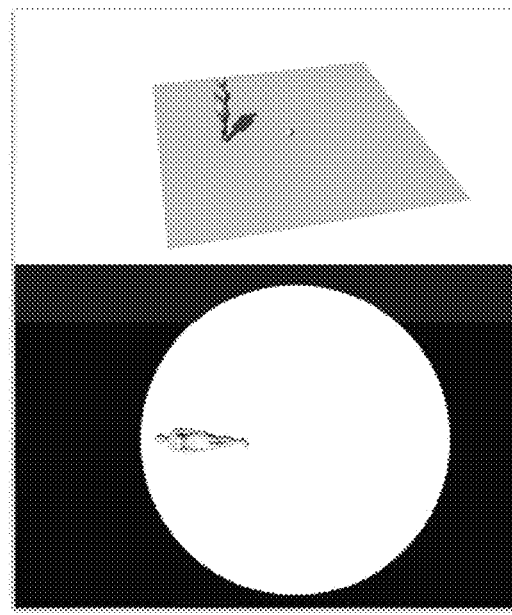
Figure 12:
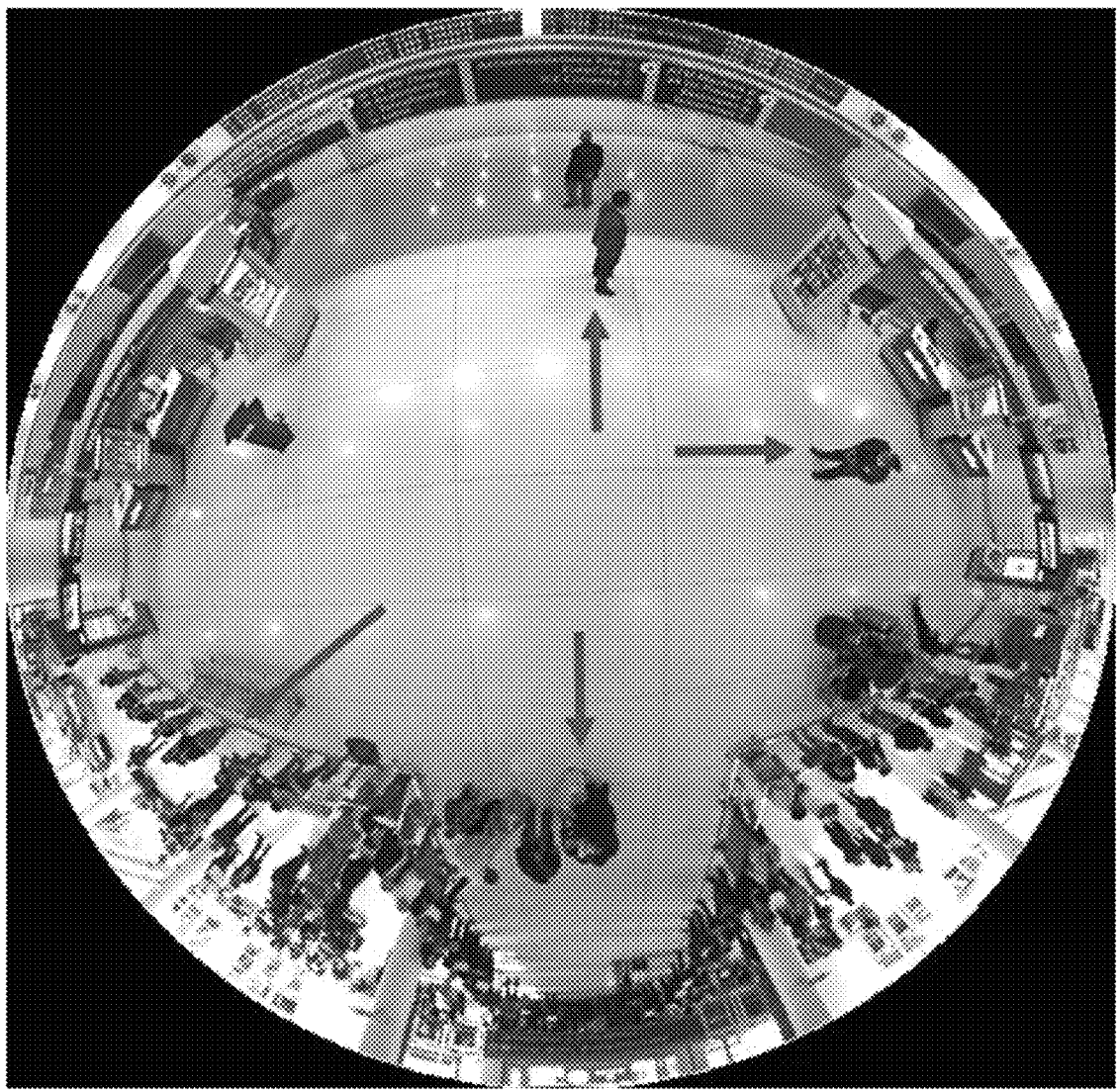

In the case of the fisheye cameras the objects orientation within the frame is directly related with the spatial relationship of the object with regards to fisheye lens. As shown in FIG. 7, a person is standing in 4 different cardinal directions around a fisheye camera include: Object position 1: Person stands on the "0 degrees axis" of the fisheye camera; Object position 2: Person stands on the "90 degrees axis" of the fisheye camera; Object position 3: Person stands on the "180 degrees axis" of the fisheye camera; and Object position 4: Person stands on the "270 degrees axis" of the fisheye camera. For each one of these objects positions the respective fisheye camera image frame is shown in FIGS. 8-11. The object rotation as a spatial relationship with regards to the camera location is shown in the image shown in FIG. 12 taken from a 180 degrees fisheye camera. As shown in the images, a fisheye camera can only utilize known deep learning algorithms in precisely the frontal region of the camera because this is the only region where object will appear undistorted (without rotation). Objects that appear in different regions of the camera Field of View will not be processed by these deep learning framework because these objects appear rotated.

In the illustrated embodiment, the system 10 includes an AI system 46 that processes full-frame 360-degree video and still images in one pass. In doing so, the system 10 is able to detect multiple objects, either in motion, or stationary and regardless of its size, location, or orientation. Using this process, the system 10 will detect an object even it is not in the user's current field of view.

The system 10 takes the inputs from specialized cameras that outputs the full 360-degree video/image from a single-lens. The inputs are very unique, in that it does not require any stitching as it comes from a single lens. Traditional methods of applying object detection is done on inputs with a standard aspect ratio of 1:1, 4:3, 16:9, or 2.4:1 in a traditional "square".

Currently, there exists multiple AI/ML models that will detect objects using the standard aspect ratios. However, those models are limited as they do not account for the objects not only changing size, but also changing orientation multiple times as it moves across the entire frame of the video.

The method of training used by the system 10, as described herein, accounts for objects no matter their orientation, location, or size. Additionally, the methods used by the system 10 ensures that the object is tracked as it moves across the entire 360-degree frame. In practical terms, an object approaching can look right side up when approaching the viewer and will appear to be rotated when moving past the viewer.

Training: The training of the system 10 first starts with the utilization of a deep learning neural network for an initial extraction of the features. The features are also matched up with the labels and the output is saved for further refinement. The neural network used for this initial feature extraction is trained on the publicly available object training sets. Once the initial features are extracted, the system 10 fine tunes the features and evaluate the features to ensure they match the labels generated. In training the models, the system leverages both CPU and GPUs.

In the next step, the updated feature set is run through a few more algorithms to generate multiple versions of the object in a randomly rotated and sized manner. The algorithms also randomly generate multiple versions of the object at varying distances.

The steps above allow the system to have the ability to detect an object, no matter where it is located in the input or what its rotation is.

The data is then split up into a two sets of data, one for training and one for testing—thus ensuring the system has source of truth by which to measure precision, recall, mean average precision and also allowing the system to generate the feature maps.

The actual model is based on the utilization of a combination of the standard Convolution Neural Network and a single shot detector architecture (SSD) to make a single pass and thus increase the accuracy of the system. The system is trained over 53 layers. To allow for detection of multiple objects and reduce training bias, the system also includes the public image dataset in the training along with the training inputs developed.

After the training of the model is complete, the system evaluates outputs and then updates the features and hyperparameter tuning to increase the precision and recall as well as speed. Next, instead of retaining the entire system, the system 10 utilizes transfer learning to start the training from layer 45 and add in another 20 layers.

Once the training is complete, the model is run against the test dataset and continue hyperparameter tuning; however, randomized test sets are continually introduced to ensure the system does not overfit the model.

Implementation: After the model has been trained, the system 10 saves the serialized model for production. The model is placed into a custom system that takes inputs, runs them against the model, and generates an output of pixel coordinates.

The system 10 uses websockets to provide for real-time output communication with the front-end system, thus allowing for a reduction in overhead normally associated with RESTful APIs.

The system 10 takes an input either in the form of an image or an RTSP video from a camera. The system 10 will process any video inputs into single frame images. The images, once transformed, will then be passed to the model which will configured to output text that will state the pixel coordinates for the nearest center of mass for every object detected in the frame.

As each frame or image is processed, it will be output in JSON format and broadcast out to the websocket so that every authenticated client connected to the websocket can receive the inputs for processing.

Once the front-end system receives the pixel coordinates, it can then further allow the user to determine which types of objects they wish to see as well as draw bounding boxes (or circles) around the detected objects.

The output will also be saved into a database along with the input video to allow for further updates to the training of the model.

Figure 13:
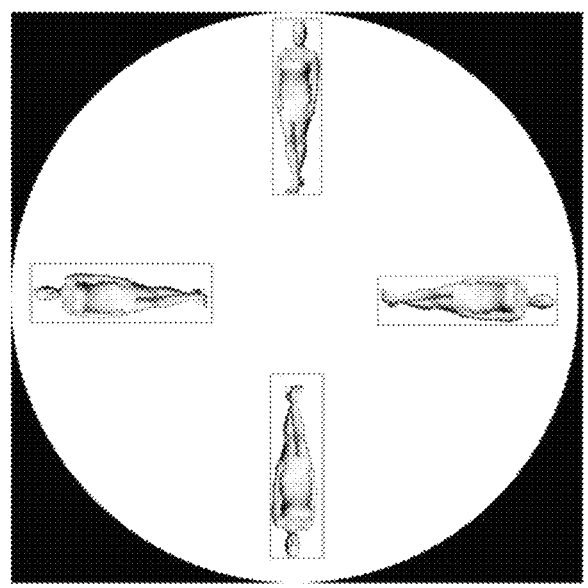
Figure 14:
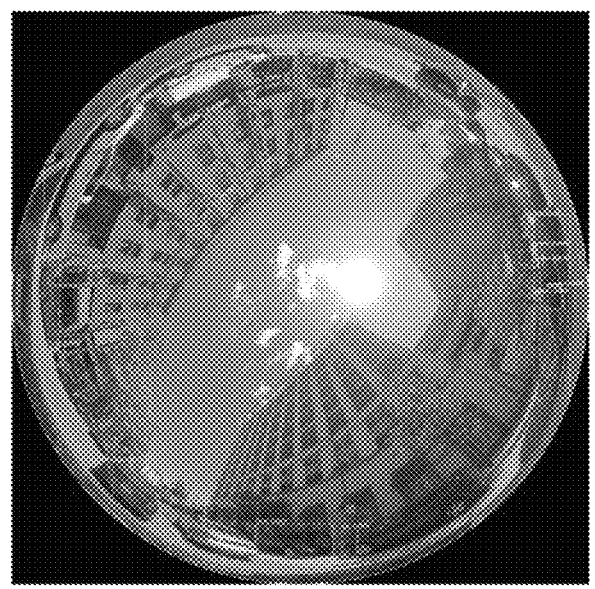

As shown in FIG. 13, as an outcome, the new method will detect the objects of interest no matter their rotation inside the frame. For example, the image shown in FIG. 14 shows the proposed method detecting vehicles in all orientations within the fisheye Field of View and deriving their pixel coordinates.

In method step 204, the object recognition system 12 is programmed to receive video images from the imaging devices 16 and recognize desired objects 18 in the video images using the training model 22. For example, the object recognition system 12 may receive data from the imaging devices 16 including live-stream video images captured from a 360-degree FOV fisheye camera and telemetry data including, but not limited to, a geographic location, elevation, and orientation of the imaging device 18.

In method step 206, the object recognition system 12 determines a geographic location of the recognized objects 18. For example, the object recognition system 12 may be programmed to transpose the fisheye pixel coordinates to calculate the detected object's geographic coordinates.

Figure 15:
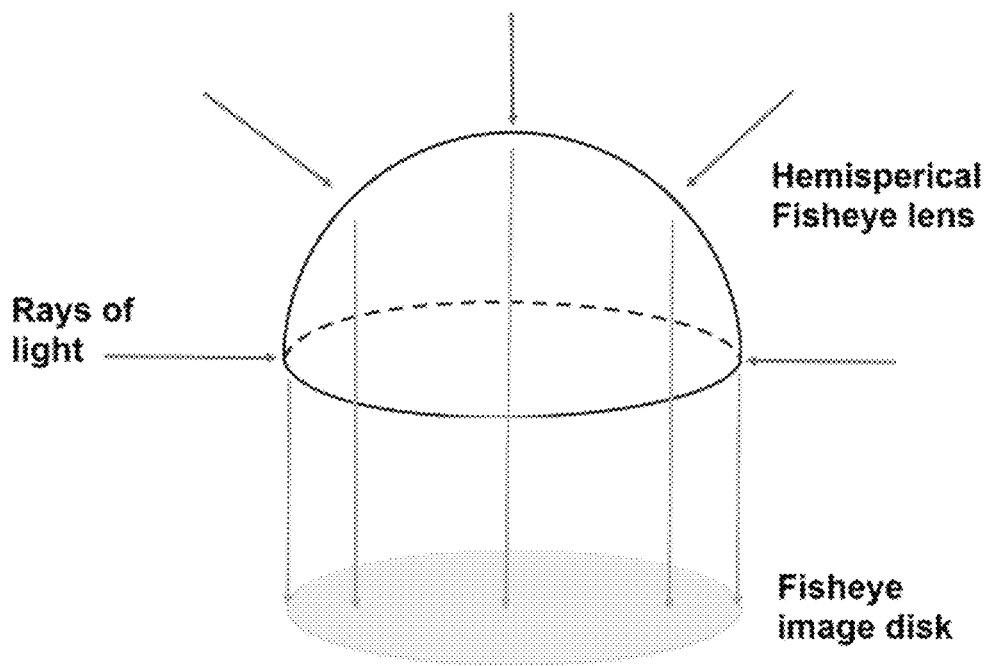
Figure 16:
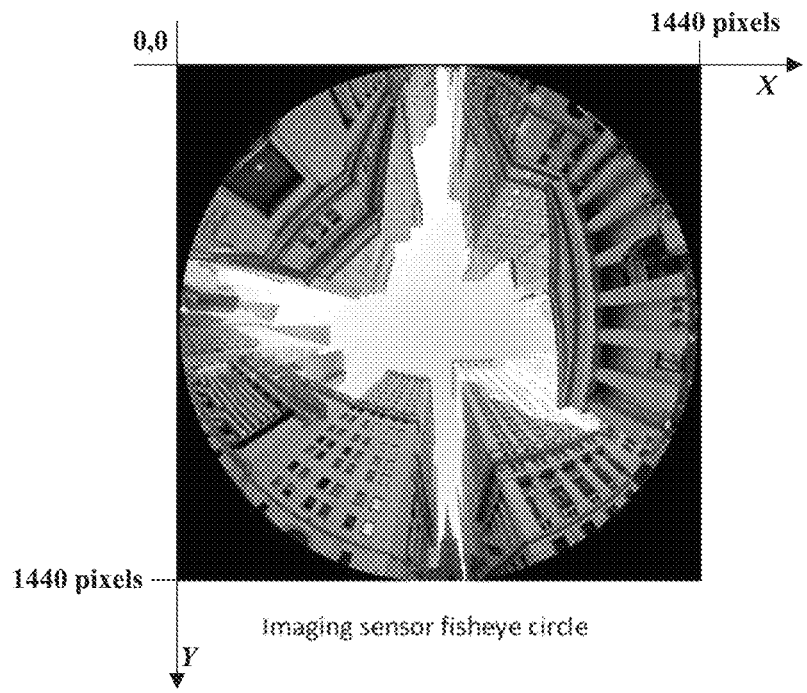
Figure 17:
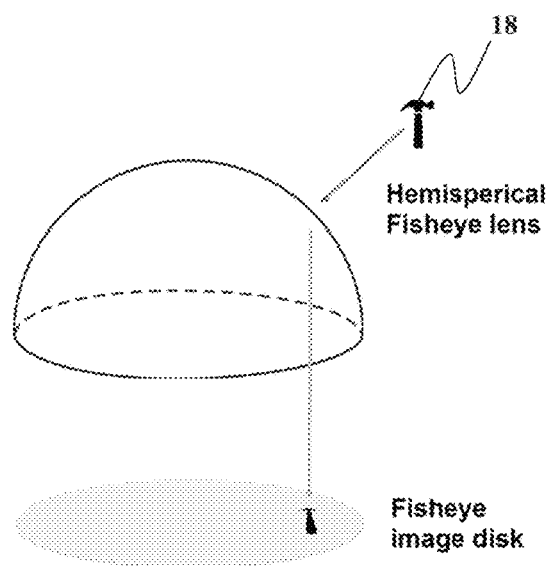
Figure 18:
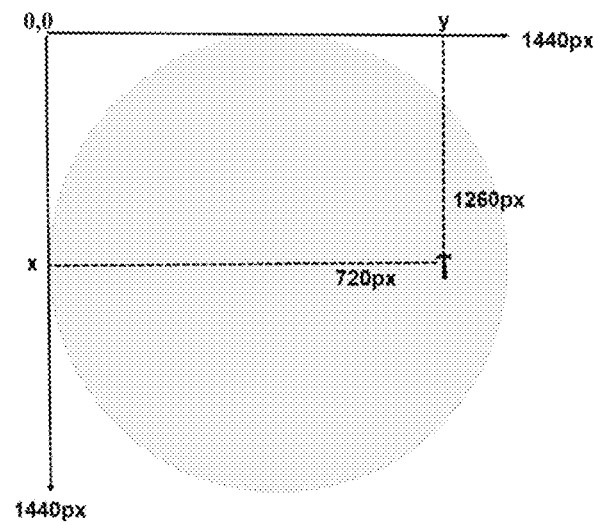

The fundamental principle of fisheye lenses is that every pixel of a hemispherical fisheye lens can be projected on a fisheye disk as shown in FIG. 15. The fisheye disk is how the imaging sensor represents the images (frames) created by the fisheye lens as shown in FIG. 16.

Figure 19:
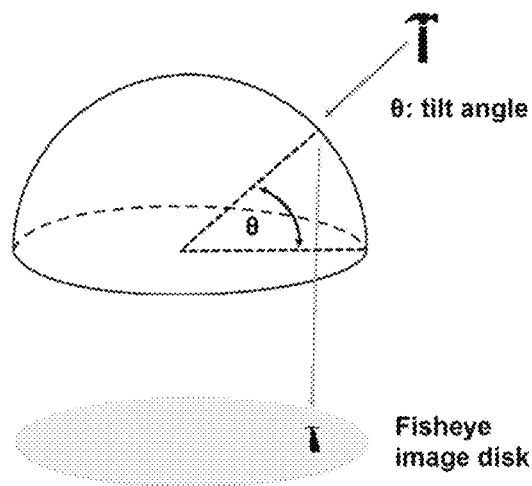
Figure 20:
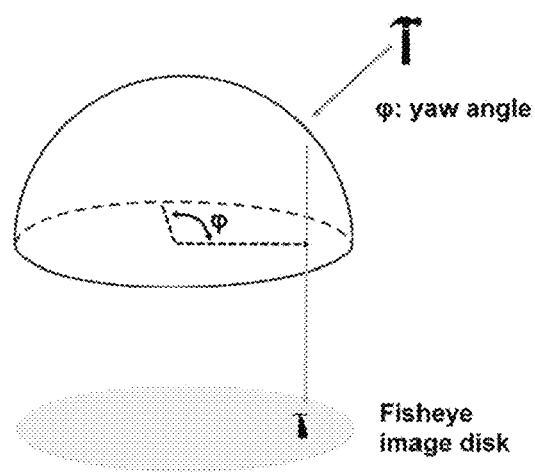

Referring to FIGS. 17-20, every pixel (or small object occupying a small number of pixels) appearing inside the fisheye circle can be represented by a pair of $\varphi$ (yaw) and $\theta$ (tilt) angles that correspond to a given pair of pixel coordinates inside the fisheye circle (as long the resolution of the fisheye circle is given, for example 1440×1440 pixels). For example, as shown in FIGS. 19 and 20, the pair of the horizontal fisheye pixel x=720 and vertical pixel y=1260 correspond to the pair of pan angle, $\varphi$=90 degrees from the top (nadir) of the fisheye image and the tilt angle, $\theta$=45 degrees above the horizon.

This analogy allows the system 10 to correspond every pair of pixels the center of an object appears to a pan/tilt angle using the simple trigonometric functions based on the right-angle theorem using the algorithm 300 shown in FIG. 21.

When the fisheye lens is mounted on an elevated location and pointing towards the ground (lens normal to the ground), as long as its location and elevation is known and its orientation (attitude) with regards to the horizon and the True North is also known then subsequently the bearing and tilt angle can be used to derive the latitude and longitude of the corresponding object from the formulas below:

Formula 1: Given a start point, initial bearing, and distance, this will calculate the destination point and final bearing travelling along a (shortest distance) great circle arc.

$$k_2 = a\ \sin(\sin k_1 \cdot \cos \delta + \cos k_1 \cdot \sin \delta \cdot \cos \varphi) \quad \text{Equation (1)}$$

$$\lambda_2 = \lambda_1 + a\ \tan 2(\sin \varphi \cdot \sin \delta \cdot \cos k_1,\ \cos \delta - \sin k_1 \cdot \sin k_2) \quad \text{Equation (2)}$$

where k is latitude, λ is longitude, φ is the bearing (clockwise from north), δ is the angular distance d/R; d being the distance travelled, R the earth's radius.

Formula 2:

$$\text{Distance between camera and target object} = \text{camera elevation}/\sin \theta \quad \text{Equation (3)}$$

where θ is a tilt angle.

This process allows the system 10 to input to algorithm a pair of fisheye pixels and derive their corresponding geographic coordinates utilizing 2D mathematics only and without having to rely on image processing techniques for dewarping the fisheye image. This approach utilizes minimal processing power and can run in a low powered processing unit for example inside the processor camera itself.

In some embodiments, the processor of the object recognition system 12 is programmed to execute an algorithm including the steps of receiving live-stream video images from the camera 16 and detecting an object of interest 18 within the live-stream video images, determining pixel coordinates associated with a center of the detected object of interest 18. The processor of the object recognition system 12 also receives the geographic location data from the camera, determines a geographic location of the object of interest 18 based on the determined pixel coordinates and the geographic location of the camera 16, and displays the live-stream video images on the user display device 34 including a visual indicator 40 of the object of interest 18 and the determined geographic location of the object of interest 18.

For example, the processor of the object recognition system 12 may be programmed to determine the pixel coordinates including an x-coordinate and a y-coordinate and determine the yaw angle φ based on the x-coordinate and determine the tilt angle θ based on the y-coordinate. The processor then executes Equations (1), (2), and (3), to determine the geographic location of the object of interest based on the yaw angle φ and the tilt angle θ.

In some embodiments, the processor of the object recognition system 12 receives the geographic location data from the camera 16 including an elevation of the camera 16 and determines the geographic location of the object of interest 18 based on the elevation of the camera 16 using Equation (3). The processor determines the angular distance δ of the object of interest 18 based on the elevation of the camera 16 and the tilt angle θ. For example, the processor determines the distance, d, between the camera 16 and the object of interest 18 using Equation (3), then determines the angular distance δ equal to d/R. The processor then determines the geographic location of the object of interest 18 based on the determined angular distance δ.

The processor of the object recognition system 12 is also programmed to receive the geographic location data including a camera bearing and determine a bearing φ of the object of interest 18 based on the camera bearing and the yaw angle φ. The processor then determines the geographic location of the object of interest 18 based on the determined bearing φ of the object of interest 18 using Equations (1) and (2). For example, the processor may receive the geographic location data including a latitude $k_1$ and a longitude $\lambda_1$ of the camera 16 and determine the geographic location of the object of interest 18 including an object latitude $k_2$ using Equation (1) and an object longitude $\lambda_2$ using Equation (2) based on the latitude and the longitude of the camera using Equations (1) and (2). The processor may then display the visual indicator 40 including the object latitude $k_2$ and the object longitude $\lambda_2$.

In method step 208, the object recognition system 12 generates and displays the presentation on the device display 34 of one or more client devices 36 displaying the live video images 20 indicating the recognized objects 18 and the corresponding geographic coordinates 30.

Importing the derived pixel coordinates of the detected object within the fisheye image into the algorithms described herein allow the system 10 to accurately calculate the real geographic coordinates of the detected object using simple mathematics that do not require image processing techniques. The only image processing part required is to run the deep learning framework that is responsible for the object detection, classification and tracking. But this process is independent of the geolocation calculation that works not only with detected objects pixel coordinates derived by deep learning frameworks but for every object that appears within the fisheye lens field of view. The deep learning framework can either run on a host computing device adjustment to the camera (on the edge) for example an NVIDIA GPU or being on a remote server (cloud based). Both architectures will detect the objects and will return the pixel coordinates to the algorithm described above.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to, only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A networked computer system for recognizing objects in video images, comprising:
  a user display device;
  a camera including:
  an imaging device having a 360° field-of-view; and
  a global positioning system (GPS) device configured to transmit geographic location data including information indicating the geographic location of the camera; and
  an object recognition system including a processor programmed to execute an algorithm including the steps of:
  receiving live-stream video images from the camera;
  detecting an object of interest within the live-stream video images;
  determining pixel coordinates associated with a center of the detected object of interest including an x-coordinate and a y-coordinate;

determining a yaw angle based on the x-coordinate;
determining a tilt angle based on the y-coordinate;
receiving the geographic location data from the camera including an elevation of the camera;
determining an angular distance of the object of interest based on the elevation of the camera and the tilt angle;
determining a geographic location of the object of interest based on the yaw angle and the determined angular distance of the object of interest; and
displaying the live-stream video images on the user display device including a visual indicator of the object of interest and the determined geographic location of the object of interest.

2. The system of claim 1, wherein the processor is programmed to execute the algorithm including the steps of:
receiving the geographic location data including a camera bearing; and
determining a bearing of the object of interest based on the camera bearing and the yaw angle; and
determining the geographic location of the object of interest based on the determined bearing of the object of interest.

3. The system of claim 1, wherein the processor is programmed to execute the algorithm including the steps of:
receiving the geographic location data including a latitude and a longitude of the camera; and
determining the geographic location of the object of interest including an object latitude and an object longitude based on the latitude and the longitude of the camera.

4. The system of claim 3, wherein the processor is programmed to execute the algorithm including the steps of:
displaying the visual indicator including the object latitude and the object longitude.

5. The system of claim 1, further comprising a training system programmed to generate an image recognition training model for use by the object recognition system, the training system including an artificial intelligence (AI) system programmed to processes full-frame 360-degree video images to train the image recognition training model;
wherein the processor is programmed to execute the algorithm including the steps of:
accessing the image recognition training model for use in detecting the object of interest within the live-stream video images.

6. A method of operating a networked computer system for recognizing objects in video images, the networked computer system including a user display device, a camera including an imaging device having a 360° field-of-view and a GPS device configured to transmit geographic location data including information indicating the geographic location of the camera, and an object recognition system including a processor, the method including the processor performing an algorithm including the steps of:
receiving live-stream video images from the camera;
detecting an object of interest within the live-stream video images;
determining pixel coordinates associated with a center of the detected object of interest including an x-coordinate and a y-coordinate;
determining a yaw angle based on the x-coordinate;
determining a tilt angle based on the y-coordinate;
receiving the geographic location data from the camera including an elevation of the camera;
determining an angular distance of the object of interest based on the elevation of the camera and the tilt angle;
determining a geographic location of the object of interest based on the yaw angle and the determined angular distance of the object of interest; and
displaying the live-stream video images on the user display device including a visual indicator of the object of interest and the determined geographic location of the object of interest.

7. The method of claim 6, including the processor performing the algorithm including the steps of:
receiving the geographic location data including a camera bearing; and
determining a bearing of the object of interest based on the camera bearing and the yaw angle; and
determining the geographic location of the object of interest based on the determined bearing of the object of interest.

8. The method of claim 6, including the processor performing the algorithm including the steps of:
receiving the geographic location data including a latitude and a longitude of the camera; and
determining the geographic location of the object of interest including an object latitude and an object longitude based on the latitude and the longitude of the camera.

9. The method of claim 8, including the processor performing the algorithm including the steps of:
displaying the visual indicator including the object latitude and the object longitude.

10. The method of claim 6, including the processor performing the algorithm including the steps of:
accessing the image recognition training model for use in detecting the object of interest within the live-stream video images;
wherein the image recognition training model is trained using a training system including an AI system programmed to processes full-frame 360-degree video images.

11. A non-transitory computer-readable storage media having computer-executable instructions embodied thereon to operate a networked computer system for recognizing objects in video images, the networked computer system including a user display device, a camera including an imaging device having a 360° field-of-view and a GPS device configured to transmit geographic location data including information indicating the geographic location of the camera, and an object recognition system including a processor, when executed by the processor the computer-executable instructions cause the processor to perform an algorithm including the steps of:
receiving live-stream video images from the camera;
detecting an object of interest within the live-stream video images;
determining pixel coordinates associated with a center of the detected object of interest including an x-coordinate and a y-coordinate;
determining a yaw angle based on the x-coordinate;
determining a tilt angle based on the y-coordinate;
receiving the geographic location data from the camera including an elevation of the camera;
determining an angular distance of the object of interest based on the elevation of the camera and the tilt angle;
determining a geographic location of the object of interest based on the yaw angle and the determined angular distance of the object of interest; and displaying the live-stream video images on the user display device including a visual indicator of the object of interest and the determined geographic location of the object of interest.

12. The non-transitory computer-readable storage media of claim 11, wherein the computer-executable instructions cause the processor to perform the algorithm including the steps of:

receiving the geographic location data including a latitude and a longitude of the camera; and determining the geographic location of the object of interest including an object latitude and an object longitude based on the latitude and the longitude of the camera; and displaying the visual indicator including the object latitude and the object longitude.

\* \* \* \* \*